W. C. FARNUM.
GEAR CUTTING MACHINE.
APPLICATION FILED AUG. 5, 1918.

1,373,957.

Patented Apr. 5, 1921.
7 SHEETS—SHEET 1.

Inventor
William C. Farnum
by Robt. P. Harris
Attorney

UNITED STATES PATENT OFFICE.

WILLIAM C. FARNUM, OF WINCHENDON, MASSACHUSETTS.

GEAR-CUTTING MACHINE.

1,373,957.  Specification of Letters Patent.  Patented Apr. 5, 1921.

Application filed August 5, 1918. Serial No. 248,306.

*To all whom it may concern:*

Be it known that I, WILLIAM C. FARNUM, a citizen of the United States, and resident of Winchendon, in the county of Worcester and State of Massachusetts, have invented an Improvement in Gear-Cutting Machines, of which the following description in connection with the accompanying drawings, is a specification, like characters on the drawings representing like parts.

The invention to be hereinafter described relates to machines for cutting the teeth of gears and other elements.

In my copending application, Serial No. 245,983, filed July 22, 1918, is shown, described and claimed a machine for this purpose comprising a rotary cutter for cutting the tooth spaces in a gear blank carried on an arbor on the work table. A master gear on the arbor rolls along a worm as the table is fed and causes the blank to roll over the cutter to generate an involute tooth space. After one space is generated, the master gear rolls off from the worm and then is turned a tooth space by a dog engaged by the master gear to index the gear blank so that the blank will be in position to have the next tooth space generated therein.

This is a good, practical mechanism for the purpose, but it is desirable to maintain continuous positive control over the gear blank throughout the tooth space generating and indexing operations. Therefore, one of the objects of the present invention is to provide simple and efficient means for generating the tooth spaces and indexing the gear blank without loss of positive control over the blank, a space being generated and the blank being indexed on each traverse of the work table and blank relatively to the cutter.

It is desirable that the cutter and blank may be relatively adjusted to present the same in active relation to form tooth spaces in blanks of different sizes and to cut tooth spaces of different depths. Another object of the invention is to provide simple and efficient means for adjusting the cutter relatively to the gear blank.

Another object is to provide means whereby the knee supporting the work table, arbor, gear blank and master gear may be readily given an angular adjustment to vary the angle of the gear blank with respect to the cutter, in order that bevel gears may be generated.

Another object is to provide improved means whereby the knee may be raised or lowered and be secured at different elevations.

Another object is to provide means for varying the position of the gear blank indexing means in order that it may serve to index the blank when the latter and the cutter are in different positions of adjustment.

And still another object of the invention is to provide improved means for automatically reversing the direction of feed of the work table after each generating and indexing operation.

With the aforesaid and other objects in view, the character of the invention may be best understood by reference to the following description of one good form thereof shown in the accompanying drawings, wherein:

Figure 1:
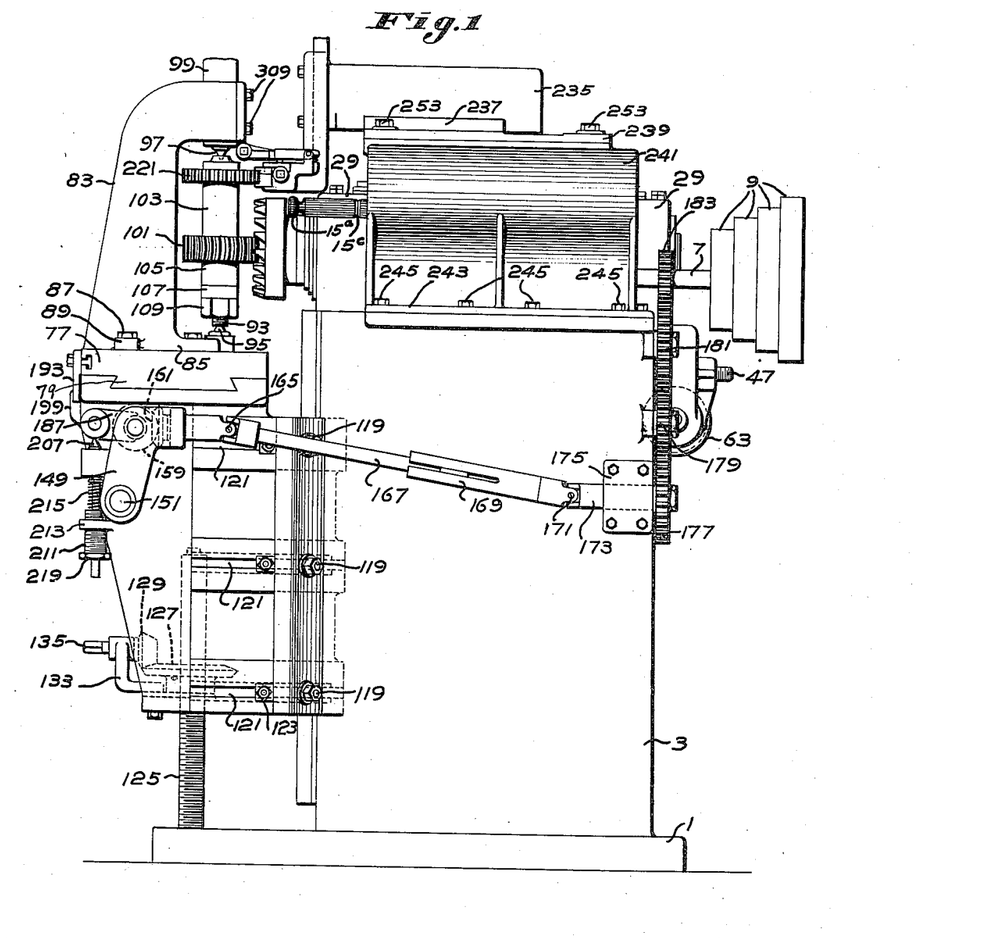
Figure 1 is a side elevation of the gear tooth cutting machine selected as one good form of the invention.
Figure 2:
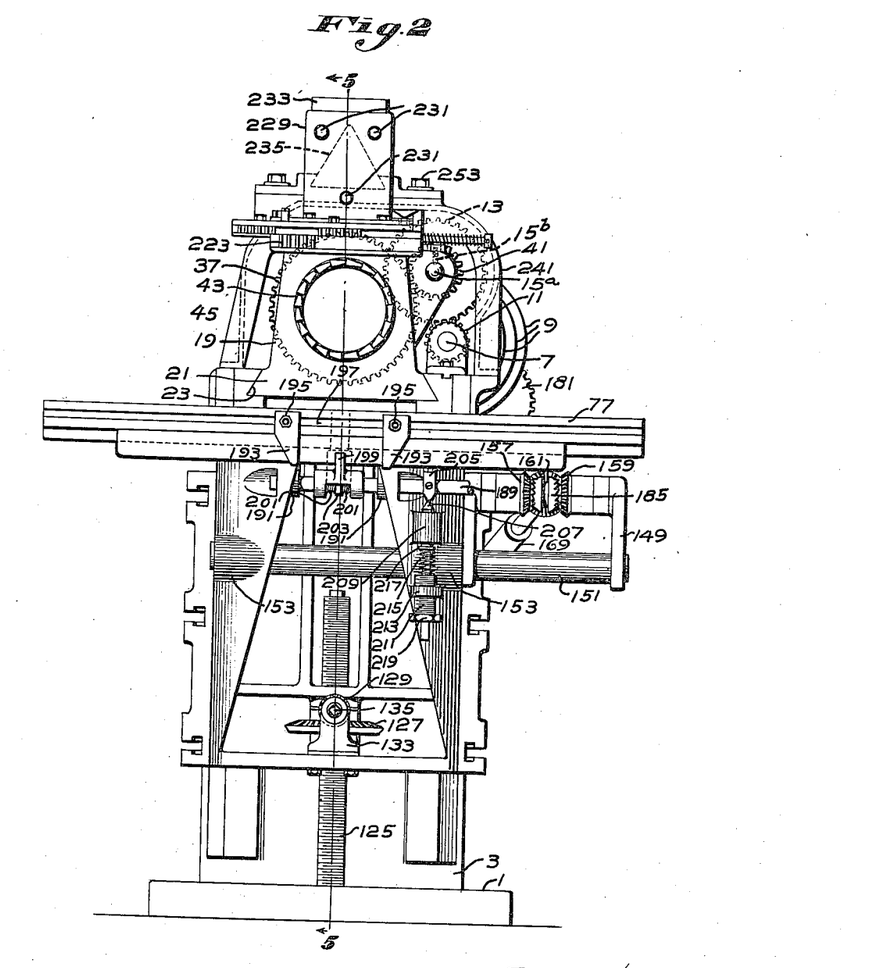
Fig. 2 is a front elevation of the machine.
Figure 4:
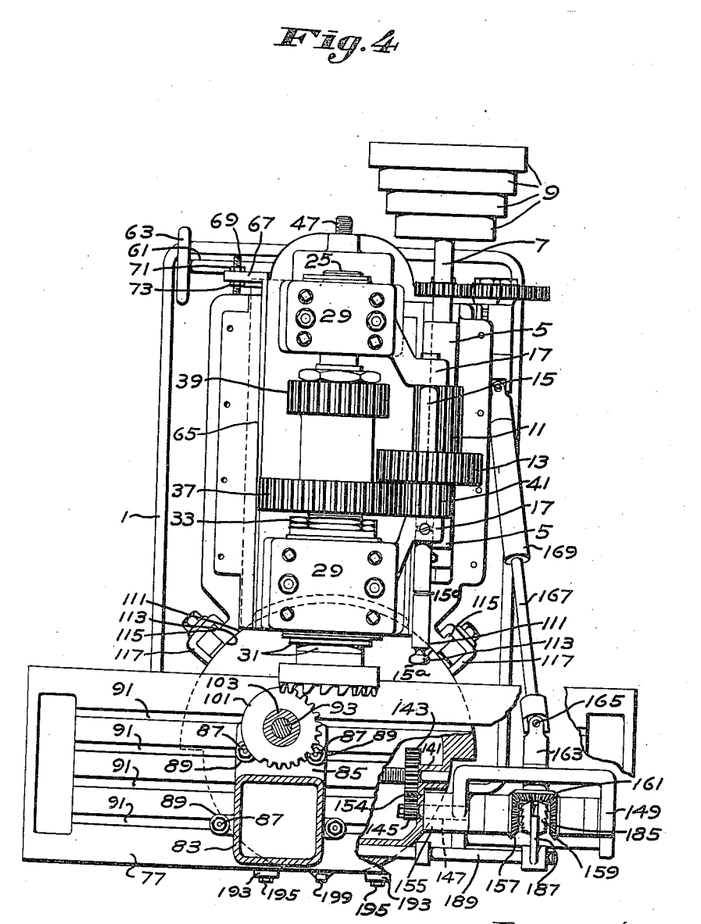
Fig. 4 is a plan thereof.

Referring to the drawings, the machine shown therein as one good form of the invention comprises a base 1 having a standard 3 rising therefrom and having bearings 5 (Figs. 1, 2 and 4) on the top thereof in which is journaled the driving shaft 7 of the machine. This shaft may be driven at different speeds by shifting a suitable belt selectively to the stepped pulleys 9 fast on an end of the shaft projecting rearward from the standard.

The driving shaft 7 may have a wide faced or sleeve gear 11 fast thereon adapted to drive a gear 13 secured to the back gear shaft 15 journaled in bearings in brackets 17 on a sliding head 19. This head may have a dovetail base 21 (Fig. 2) adapted to slide in a guideway 23, as more fully hereinafter described.

Figure 5:
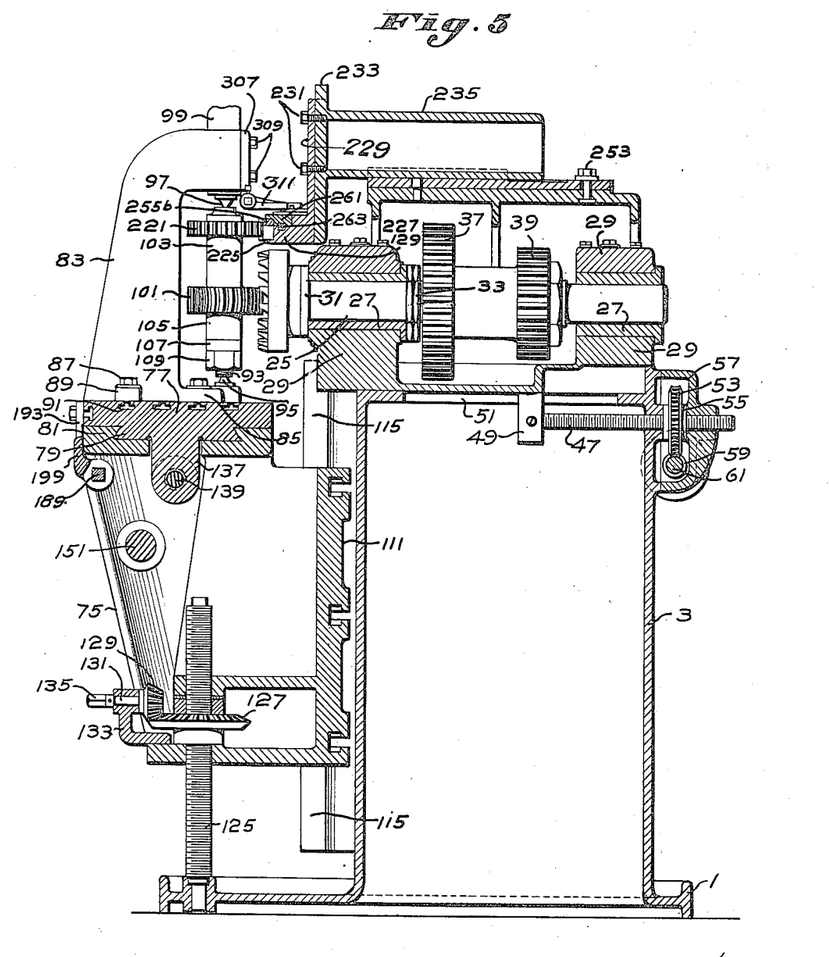
Fig. 5 is a vertical section through the machine.

A spindle 25 (Fig. 5) is journaled in bushings 27 in bearings 29 in the sliding head 19, said spindle being confined against movement in the direction of its axis by a flange 31 on said spindle, and nuts 33 at opposite ends of the front bearing 29, suitable washers being interposed between said flange, nuts, and the ends of said bearing.

To drive the spindle, a large gear 37 and a smaller gear 39 are mounted fast thereon and adapted to mesh with the back gears 41 and 13 respectively. Thus, when the back gears are slid axially with their shaft to cause the pinion 41 to mesh with the large gear 37, the spindle will be driven at one speed, and when the back gears are slid rearwardly with their shaft to cause the gear 13 to mesh with the gear 39, the spindle will be driven at a more rapid speed. The sleeve gear 11 is sufficiently long to allow adjustment of the back gears and their shaft without loss of engagement between the back gear 13 and the sleeve gear 11. The front end of the back gear shaft may be formed to present a handle 15ª (Fig. 1) and may be held in its different positions of axial adjustment by a spring pressed dog 15ᵇ adapted to enter either of a pair of circumferential grooves 15ᶜ in said shaft.

A suitable cutter may be provided to act upon the work. In the present instance, a cutter 43 is provided having a series of teeth thereon of suitable form to produce an involute tooth space when the cutter is rotated and a gear blank is rolled transversely to the annular path of rotation of the teeth of the cutter. This cutter may be mounted on the front end of the spindle 25, and may be rotated at two different speeds by the gears on the spindle and the back gears as described, and each of these speeds may be varied by shifting the belt to the different stepped pulleys.

Figure 3:
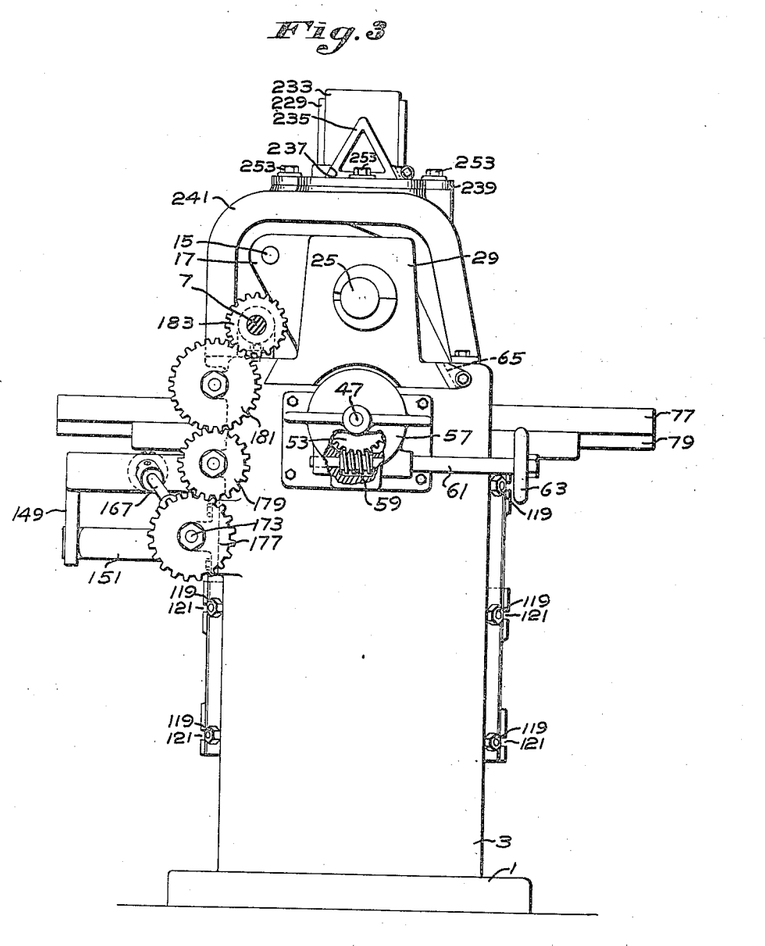
Fig. 3 is a rear elevation thereof.

It is desirable that the cutter may be adjusted toward and from the blank operated upon, in order that blanks of different sizes may be cut, in order that teeth of different depths may be cut in the blank, and to position the cutter in proper working relation with respect to the blank. The sliding head carrying the cutter spindle enables such adjustment of the cutter to be readily made. The means for adjusting the head, in the present form of the invention, comprises a screw 47 (Figs. 1, 3 and 5) fastened to a lug 49 depending from the head through an elongated slot 51 in the top of the standard. A worm wheel 53 has a hub 55 threaded to the screw shaft 47, and is confined against movement longitudinally of said screw shaft by a housing 57 at the rear of the standard 3. A worm 59 meshes with the worm wheel and is mounted fast on a shaft 61 journaled in bearings in said housing, one end of said shaft projecting laterally beyond the standard where it receives a hand wheel 63. The construction is such that when the hand wheel is turned, the worm will rotate the worm wheel and cause the screw shaft to feed axially through the worm wheel and adjust the head, spindle and cutter as desired.

It is desirable that the head may be firmly secured in its different positions of adjustment, in order that there may be no lost motion of the cutter. To accomplish this, in the present instance, a tapered gib 65 (Figs. 3 and 4) may be interposed between one side of the dovetail base of the head and its guide, and may have an arm 67 projecting laterally therefrom and provided with an aperture receiving a stud screw 69 projecting from and secured to the rear end of the standard. The adjusting nuts 71 and 73 may be threaded to said screw stud at opposite faces of the arm 67. The construction is such that adjustment of the nuts will permit longitudinal adjustment of the tapered gib to secure or release the spindle head as required.

Having described the cutter, the driving means therefor, and the adjusting means therefor, next will be described the support for the work operated upon by the cutter. In the present instance of the invention, this support is in the form of a knee 75 on which is mounted a work table 77 having a dovetail projection 79 at the bottom thereof adapted to slide along a guideway 81 formed in the top of the knee. An elbow arm 83 has a base 85 resting on the work table and adapted to be adjusted longitudinally thereof and secured by bolts 87 projecting through ears 89 on said base and into T-shaped grooves 91 extending longitudinally of the top of the work table. An arbor 93 is rotatively mounted between cone bearings 95 and 97 in the base and upper end of said arm. The cone bearing 97 may be formed on a stud 99 which may be adjusted with respect to the arm to allow ready insertion of the arbor between said bearings and removal therefrom.

The blank operated upon by the cutter may be carried by this arbor, the blank 101, in the present instance, being of a form suitable to have curved teeth formed therein by the rotary cutter. This blank may be mounted on the arbor and secured in proper elevation by spacing sleeves 103, 105 and 107 secured by a nut 109 threaded to said arbor adjacent the lower end thereof.

In cutting the teeth of gears with certain types of cutter, and in other classes of work, it is desirable to adjust the knee angularly with respect to the standard so that the table and gear blank may be fed in generating a tooth space in a path oblique to the axis of the cutter. To accomplish this, in the present instance, the knee is formed to present a curved rear face 111 (Fig. 4) adapted to seat against similarly curved faces 113 of the standard. To secure the knee in its different positions of angular adjustment, in the present instance, the standard is formed to present flanges or guides 115 at the ends of the curved faces 113, and clamping bars 117 are provided conveniently of channel form having short flanges for engagement with the guideways 115, and long flanges for engagement with the curved face of the knee. Bolts 119 project through these clamp bars and have heads received by horizontal T-shaped grooves 121 in the knee. Stop blocks 123 may be secured by bolts to said grooves and facilitate adjustment and positioning of the knee with relation to the standard. The construction is such that when the bolts 119 are loosened, the knee may be angularly adjusted and cause its grooves 121 to slide along the heads of the bolts 119 to the position desired, and then the bolts 119 may be tightened and thereby press the clamp bars into secure frictional engagement with the guideways 115.

The clamp bars and bolts 119 will also admit vertical adjustment of the knee, and serve to secure the same at various elevations. To raise and lower the knee, in the present instance, a screw post 125 (Figs. 1, 2 and 5) may be secured in the base 1 and rise therefrom through an aperture in the bottom of the knee. A bevel gear 127 has a hub threaded to said screw post, and said bevel gear meshes with a bevel pinion 129 on a stub shaft 131 journaled in a bracket 133 secured to the knee, and having a squared end 135 for receiving a suitable handle. The construction is such that the stub shaft and pinion may be rotated to cause the bevel gear 127 and knee to travel up and down along the screw post to position the knee at the elevation desired.

Suitable means may be provided to feed the work table 77 horizontally along the top of the knee. To this end the table may have a lug 137 (Figs. 2 and 5) depending therefrom, and threaded to a screw shaft 139 journaled in boss bearings 141 in the knee, said shaft being confined against longitudinal movement relatively to the knee. To rotate the table feed screw shaft, it may have a gear 143 (Fig. 4) fast thereon meshing with a pinion 145 fast on a shaft 147 journaled in bearings in a U-shaped bracket 149 carried by a shaft 151 fixed in boss bearings 153 on the knee, the latter having a web 154 confined between the gear 143 and a boss 155 seated in a recess in the knee to contribute to the positioning of said bracket. To rotate the shaft 147 and feed screw shaft 139 to feed the table in opposite directions, the shaft 147 may have bevel gears 157 and 159 loose thereon meshing with a bevel gear 161 intermediate and common to the bevel gears 157 and 159. The intermediate bevel gear 161 is fast on a stub shaft 163 journaled in a bearing in the bracket 149 and connected by a universal joint 165 with a shaft 167 telescoping with and splined to a sleeve shaft 169 connected by a universal joint 171 with a stub shaft 173 journaled in a bearing in a bracket 175 secured to the standard. A gear 177 fast on the stub shaft 173 is rotated by a pair of idler gears 179 and 181 from a gear 183 fast on the main driving shaft 7, referred to. The construction is such that through the transmission described the intermediate bevel gear 161 may be rotated in the various positions of angular adjustment and elevation of the knee.

To connect the bevel gears 157 and 159 with the shaft 147, a clutch member 185 (Figs. 2 and 4) is splined to said shaft and provided with a circumferential groove receiving a fork 187 on a rod 189 adapted to slide longitudinally in boss bearings 191 in the front of the knee.

It is desirable to shift the clutch member automatically at the ends of the traverse of the table to automatically change the direction of feed of the table. To accomplish this, a pair of dogs 193 may be secured by bolts 195 in a T-slot 197 at the front of the table, and a yoke 199 may be slidably mounted on the rod 189 and project upward into the path of movement of the dogs 193. Coil springs 201 are mounted on said rod between the legs of said yoke and a flange 203 fast on said rod, and are energized by movement imparted thereto from the dogs through the yoke. One or the other thereof is compressed depending on the direction of movement of the table. Coöperating with the tapered nose of a lug 205 on said rod is the tapered end of a plunger 207 adapted to slide vertically in a bearing 209 on the knee, and in a sleeve 211 threaded in a bearing 213 on the knee. The coil spring 215 encircles said plunger and is confined between the upper end of the sleeve 211 and a flange 217 on said plunger. The threaded sleeve may have a nut 219 formed thereon to facilitate adjustment of said sleeve with respect to the bearing 213 to vary the tension of the coil spring 215 as desired.

The construction is such that in the course of the travel of the table, one of the dogs 193 will engage the yoke 199 and compress or energize one of the springs 201 and then through said spring shift the rod 189 until the tapered end of the dog 205 rides beyond the point of the tapered end of the plunger 207, whereupon the compression of the spring 201 being released, will shift the rod and shift the clutch member 185 from one of the bevel gears 157 and 159 to the other to connect the same with the shaft 147 and change the direction of feed of the table. When the tapered dog 205 wipes past the plunger, it depresses the same and energizes its spring 215, and after passing its point allows the plunger to spring up and hold the clutch in its shifted position.

Figure 9:
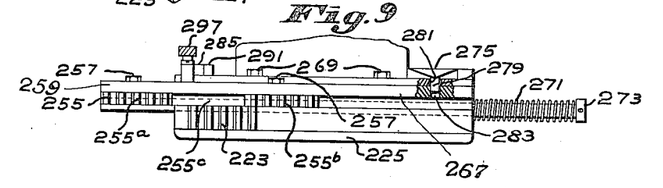
Fig. 9 is a front elevation of the racks of the indexing mechanism and parts coöperating therewith.

Next will be described the means for rolling the gear blank across the cutter to generate an involute tooth, and the means for automatically indexing the gear blank, in order that after one tooth space is cut therein, it may be brought in the proper position to have the next tooth space cut therein, and so on until tooth spaces are cut in the blank throughout the periphery thereof, or the extent desired. To accomplish this, in the present instance, a master or indexing gear 221 (Figs. 1, 5 and 10) may be mounted on the arbor 103, referred to, carrying the gear blank, said gear being confined thereon by the spacing sleeves therefor. This master gear is adapted to mesh with a horizontal main rack 223 resting on a flange 225 (Figs. 7 and 9) secured to a carrier bar 227 projecting laterally from a U-shaped bracket 229 secured by screw bolts 231 to a vertical plate 233 at the front end of a triangular head 235. The base of this head may fit a dovetail groove 237 (Figs. 3 and 7) in a plate 239 mounted on a hood 241 covering the cutter spindle and having feet 243 secured by screw bolts 245 to the top of the standard. The construction is such that the head may slide along the dovetail groove 237 to adjust the main rack 223 so that it may mesh with master gears of different sizes and conform to the adjustment of the cutter and its head. The rack carrying head 235 may be secured in different positions of adjustment by a tapered gib 247 similar to the tapered gib 65 described for securing the spindle head in its positions of adjustment.

In the use of certain types of cutters for cutting gears, it is desirable that the rack head 235 may receive angular adjustment to correspond with the angular adjustment of the knee. This angular adjustment of both the rack head and knee is desirable in order that the line of travel of the table may be adjusted to correspond with the angle of the cutter used. For example, if a conical cup cutter is used, in which the teeth are inclined to the axis of the cutter, the knee and rack head should be adjusted to an angle corresponding to the angle the cutter teeth form with their axis. Further-more, should it be desirable to use the gear cutting machine for milling machine work other than cutting gears, it may be desirable to adjust the table to mill tapers, etc.

To provide means for permitting the rack head 235 to be given the desired angular adjustment, the plate 239 supporting the rack head may have arcuate slots 251 (Figs. 6 and 7) formed therein receiving bolts 253 projecting through holes in the top of the hood 241. The construction is such that the bolts 253 may be released and the plate 239 may be angularly adjusted as required, and then said bolts may be tightened to secure said plate in position.

The means for indexing the master gear and blank, in the present instance of the invention, comprises an index rack 255 (Figs. 9 and 10) above the main rack 223, and having portions 255$^a$ and 255$^b$ separated by a space 255$^c$ substantially equal in length to the main rack 223. The index rack 255 is secured by screw bolts 257 to a cap plate 259 connected by screws 261 to a slide bar 263 (Fig. 8) adapted to slide in a groove 265 in the carrier bar 227. A cover plate 267 projects over the cap plate 259 and is secured by screw bolts 269 to the carrier bar 227. A coil spring 271 encircles the end of the slide bar 263 projecting beyond the carrier bar, said spring being confined between one end of the latter and a head 273 at the end of the slide bar. A pawl 275 on a shaft 276 has a tapered head 277, and a lock pin 279 adapted to project through a hole 281 in the cover plate and into a hole 283 in the cap plate to temporarily lock the index rack against sliding movement, as more fully hereinafter described. Gravity will tend to rock the feed pawl downward, but this movement may be assisted by a coil spring 275$^a$ engaging a heel 275$^b$ formed on said pawl. A shifting lever 285 is pivotally connected to a screw 287 secured to the cap plate of the index rack, and works between a pair of fulcrum pins 289 and 291 secured to the cover plate.

A pair of dogs 293 and 295 depend from arms 297 and 299 respectively, said arms being adjustably secured by screws 301 to a rod 303 secured by screws 305 to a bracket 307 connected by screw bolts 309 to the arm 83 referred to that receives the arbor. A pawl releasing dog 311 may be adjustably secured by a screw 313 to the rod 303.

Figure 6:
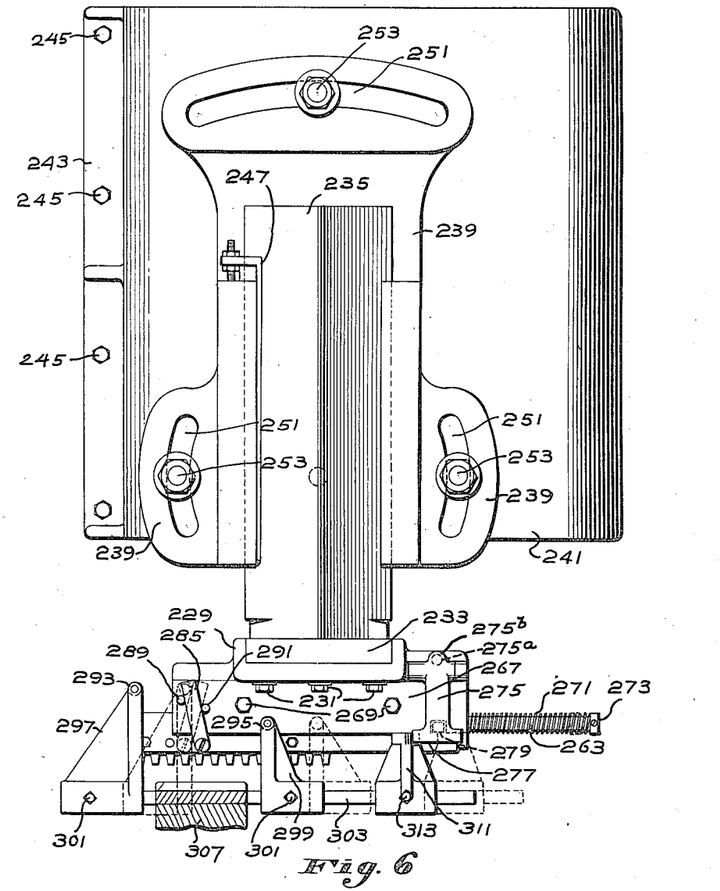
Fig. 6 on an enlarged scale is a plan of the indexing mechanism and the support therefor.
Figures 7, 8:
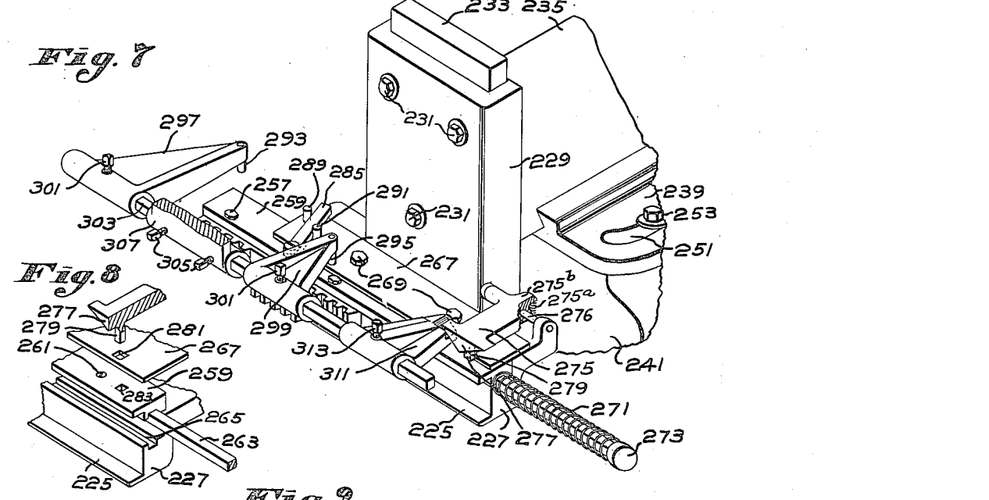
Fig. 7 is a perspective view of the mechanism shown in Fig. 6.
Fig. 8 is a detail perspective of parts of the indexing mechanism.
Figure 10:
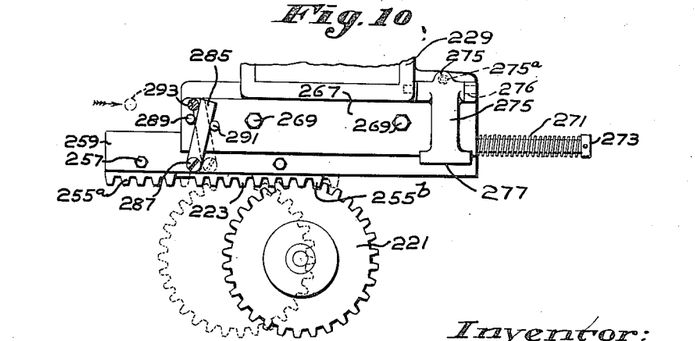
Fig. 10 is a plan showing the racks and master gear of the indexing mechanism in different positions assumed by them in the generation of a tooth space in a gear blank, and the indexing of the blank.

In operation, in the course of the travel of the work table to the right of Figs. 6, 7 and 10, the master gear will roll from its dotted position (Fig. 10) where it meshes with the main rack, to its full line position where it engages the index rack portion 255$^b$. Then, on further movement of the table, the dog 293 will engage the free end of the shifting lever 285 and rock the same against the fulcrum pin 291, thereby shifting the index rack to the left a sufficient distance to turn the master gear and gear blank an increment to index the latter. This movement will tension the coil spring 271. On completion of this indexing movement, the lock pin 279 of the pawl 275 will drop into the hole 283 of the cap plate of the slide bar 263. Then one of the dogs 193 on the table engages the yoke 199 and shifts the clutch member 185, reverses the feed of the table, and causes the master gear to roll back from the index rack portion 255$^b$ into mesh with the main rack 223. As the master gear rolls over the main rack, the blank is rolled across the cutter and a tooth space is generated in the blank. When the master gear reaches a mid-position on the main rack, the dog 311 engages the tapered head 277 of the pawl 275 and lifts the lock pin 279 from the hole 283, thereby permitting the previously energized spring 271 to shift the slide bar 263 and index rack to the right in readiness for the next indexing operation. As the master gear continues to roll to the left of Figs. 7 and 10, it rolls from the main rack into engagement with the index rack portion 255$^a$, and then the dog 295 engages the shifting lever 285 and rocks the same against the fulcrum pin 289, thereby shifting the index rack in the same direction as before, and causing the master gear and gear blank to rotate an increment again to index said blank. On completion of this indexing operation, the work table is automatically reversed and the master gear is rolled back onto the main rack. After it reaches a substantially mid-position on said rack, the dog 311 releases the pawl 275, and the previously energized spring 271 again shifts the slide bar 263 and index rack back to its original position in readiness for the next indexing operation.

Thus, in each traverse of the work table, the gear blank is rolled past the cutter, a complete tooth space is generated therein, and the gear blank is automatically indexed, and this is accomplished while maintaining positive control of the master gear throughout these operations.

It will be understood that the invention is not limited to the specific embodiments shown, but that various deviations may be made therefrom without departing from the spirit and scope of the appended claims.

What is claimed is:—

1. A machine of the character described, comprising, in combination, a gear tooth cutter, means to support a gear blank in position to be acted upon by said cutter; and means to index said gear blank including a pair of racks, a master gear adapted to mesh with said racks, and means relatively to adjust said racks to turn said master gear a step after the latter has rolled from one rack to the other.

2. A machine of the character described, comprising, in combination, a rotary cutter, a support, an arbor mounted on said support and adapted to receive a gear blank, a master gear on said arbor, a normally fixed rack, a rack movable relatively to said normally fixed rack, means to feed said support and arbor relatively to said normally fixed rack to roll said master gear from said normally fixed rack to said movable rack and means to move said movable rack to turn said master gear and index said blank.

3. A machine of the character described, comprising, in combination, a gear tooth cutter, means to support a gear blank in position to be acted upon by said cutter; and means to index said gear blank including a master gear, a toothed member adapted to mesh with said gear, and means to adjust said toothed member in a direction of the pitch line to turn said gear blank a step.

4. A machine of the character described, comprising, in combination, a gear tooth cutter, a master gear for connection with a gear blank, a normally fixed rack, an indexing rack, means to roll said master gear along said fixed rack to generate an involute tooth space in said blank, and then onto said indexing rack, and means to move the latter in a direction of its pitch line to turn said master gear an increment to index said blank.

5. A machine of the character described, comprising, in combination, a gear tooth cutter, a master gear for connection with a gear blank, a rack, means to roll said master gear first along said rack to generate an involute tooth space in said blank, and then out of mesh with said rack, and means cooperating with said master gear to index said blank after said master gear has rolled from said rack, said indexing means constructed to maintain continuous, positive, controlling engagement with the master gear while the latter is out of engagement with the rack.

6. A machine of the character described, comprising, in combination, a rotary cutter, means to support a blank in position to be acted upon by said cutter, feed means to roll said blank across said cutter to generate an involute tooth space in said blank, and means to index said blank, said feed means and index means having provision for maintaining continuous positive control over said blank to hold the blank against accidental rotation in either direction throughout the indexing operation.

7. A machine of the character described, comprising, in combination, a cutter, means to rotate said cutter, means to support a blank in position to be acted upon by said cutter, a master gear connected to said blank, relatively movable toothed members, means to roll said master gear along one of said members onto the other to generate an involute tooth space in said blank, and means to move the latter tooth member in the direction of its pitch line to rotate the master gear and blank an increment to index said blank.

8. A machine of the character described, comprising, in combination, a rotary cutter, means to support a blank in position to be acted upon by said cutter, including a table, an indexing rack, a generating rack, a master gear mounted on said table and connected to said blank, means to feed said table to roll said master gear from said generating rack to said indexing rack, and means operated by feed of said table to move said indexing rack to turn the master gear an increment and index said blank.

9. A machine of the character described, comprising, in combination, a cutter, means to support a gear blank in position to be acted upon by said cutter, a main rack, an indexing rack, a master gear for connection with said blank and adapted to roll along said racks, a shifting lever for said indexing rack, and means carried by said support for operating said shifting lever to move said indexing rack and index the master gear and blank after the master gear has rolled from said main rack to said indexing rack.

10. A machine of the character described, comprising, in combination, a rotary cutter, means to support a blank in position to be acted upon by said cutter, a main rack, an indexing rack, a master gear for connection with said blank adapted to roll along said racks, an operating member for said indexing rack, and means carried by said support for automatically actuating said operating member to cause said indexing rack to index said master gear and blank after the master gear has rolled from said main rack to said indexing rack.

11. A machine of the character described, comprising, in combination, a rotary cutter, means to support a blank in position to be acted upon by said cutter, means to feed said support and blank relatively to said cutter, a master gear for connection with said blank, a main rack, an indexing rack, an operating member associated with said indexing rack, and a pair of dogs for shifting said operating member to move said indexing rack to index said master gear and blank after said master gear has rolled from said main rack to said indexing rack.

12. A machine of the character described, comprising, in combination, a cutter, means to support a blank in position to be acted upon by said cutter, means to feed said support to move said blank relatively to said cutter, a master gear for connection with said blank, a main rack, an indexing rack, said master gear being adapted to roll from said main rack to said indexing rack and back to said main rack in the course of the feeding of said support, and means to shift said indexing rack to turn said master gear an increment and index said blank while the master gear is in mesh with said indexing rack.

13. A machine of the character described, comprising, in combination, a rotary cutter, means to support a blank in position to be acted upon by said cutter, a master gear for connection with said blank, a main rack, an indexing rack, an operating lever for said indexing rack, a pair of fulcrum elements disposed at opposite sides of said operating member, and means carried by said support for rocking said operating member on said fulcrum elements to shift said indexing rack in the same direction to index the master gear and blank when said support is fed in opposite directions.

14. A machine of the character described, comprising, in combination, a rotary cutter, means to support a blank in position to be acted upon by said cutter, a master gear for connection with said blank, main and indexing racks, means to feed said support to roll said master gear to and from said main and indexing racks, and means operated by movement of said support for automatically shifting said indexing rack in the same direction to index the master gear and blank when said support is fed in opposite directions.

15. A machine of the character described, comprising, in combination, a rotary cutter, means to support a blank in position to be acted upon by said cutter, and means to index said blank including a master gear, a main rack, an indexing rack, means operated by movement of said support to move said indexing rack in one direction to rotate the master gear an increment, and spring means for moving said indexing rack in the opposite direction after completion of an indexing operation.

16. A machine of the character described, comprising, in combination, a rotary cutter, means to support a blank in position to be acted upon by said cutter, and means to index said blank including a main rack, an indexing rack, a master gear adapted to roll along said main rack to generate an involute tooth space and onto said indexing rack, operating means for said indexing rack actuated by movement of said support for moving said indexing rack in one direction to index the master gear and blank, means to lock said indexing rack against movement after an indexing operation until the master gear is returned to the main rack, and means for automatically then moving said indexing rack into position in readiness for the next indexing operation.

17. A machine of the character described, comprising, in combination, a rotary cutter, means to support a blank in position to be acted upon by said cutter, a main rack, an indexing rack, a master gear for association with said blank adapted to roll along said racks, means to shift said indexing rack to turn said master gear to index the blank, latch means for automatically temporarily holding said indexing rack stationary after an indexing operation, and means for releasing said latch means to allow return of said indexing rack to its original position after the master gear has rolled from said indexing rack to said main rack.

18. A machine of the character described, comprising, in combination, a rotary cutter, means to support a blank in position to be acted upon by said cutter, a main rack, an indexing rack, a master gear for association with said blank and adapted to roll along said racks, means operated by movement of said support for moving said indexing rack to index the master gear and blank, spring means energized by such movement of said indexing rack, and means for rendering said spring means effective to return said indexing rack to its original position after an indexing operation.

19. A machine of the character described, comprising, in combination, a rotary cutter, means to support a blank in position to be acted upon by said cutter, a main rack, indexing racks separate from but forming continuations of the ends of said main rack, a master gear for association with said blank and adapted to roll along said main rack and indexing racks, and means for automatically moving said indexing racks to rotate the master gear an increment and index the blank after the master gear has rolled from said main rack to said indexing racks.

20. A machine of the character described, comprising, in combination, a cutter, means to support a blank in position to be acted upon by said cutter, a main rack, an indexing rack forming a continuation of said main rack but separate therefrom, a master gear adapted to roll along said racks, and means for moving said indexing rack to turn said master gear and index the blank after the master gear has rolled from the main rack onto said indexing rack.

21. A machine of the character described, comprising, in combination, a rotary cutter, means to support a blank in position to be acted upon by said cutter, and means automatically to index the gear blank including a master gear mounted on said support and associated with said blank, an indexing rack adapted to mesh with said master gear, an operating member for said indexing rack, a carrier mounted on said support, and a pair of dogs on said carrier, one for actuating said rack operating member when said support is fed in one direction, and the other for actuating said rack operating member when said support is fed in the opposite direction.

22. A machine of the character described, comprising in combination, a rotary cutter, means to support a blank in position to be acted upon by said cutter, a main rack, an indexing rack, a master gear for association with said blank adapted to roll along said racks, means automatically to move said indexing rack to index the master gear and blank, and a carrier for said racks adjustable to present said racks in different positions.

23. A machine of the character described, comprising, in combination, a rotary cutter, means to support a blank in position to be acted upon by said cutter, a main rack, an indexing rack, a master gear for association with said blank adapted to roll along said racks, means automatically to move said indexing rack to index the master gear and blank, and a carrier for said racks having provision for angular adjustment to vary the angle of said racks with respect to said cutter.

24. A machine of the character described, comprising, in combination, a rotary cutter, means to support a blank in position to be acted upon by said cutter, a main rack, an indexing rack, a master gear for association with said blank adapted to roll along said racks, means automatically to move said indexing rack to index the master gear and blank, and a carrier for said racks, having provision for rectilinear adjustment thereof to vary its position with respect to said cutter.

25. A machine of the character described, comprising, in combination, a rotary cutter, means to support a blank in position to be acted upon by said cutter, a main rack, an indexing rack, a master gear for association with said blank adapted to roll along said racks, means automatically to move said indexing rack to index the master gear and blank, a carrier for said racks, a guide therefor, and means to secure said carrier in different positions of adjustment longitudinally of said guide.

26. A machine of the character described, comprising, in combination, a rotary cutter, means to support a blank in position to be acted upon by said cutter, a main rack, an indexing rack, a master gear for association with said blank adapted to roll along said racks, means automatically to move said indexing rack to index the master gear and blank, a carrier, a supporting plate for said carrier having curved slots therein, a base for said plate, and bolts entered through said curved slots into said base for securing said plate in different positions of angular adjustment.

27. A machine of the character described, comprising, in combination, a rotary cutter, a spindle therefor, a standard having bearings for said spindle, a hood mounted on said standard over said spindle, a carrier mounted on said hood, a main rack and an indexing rack on said carrier, means for supporting a blank in position to be operated upon by said cutter, and a master gear in position to mesh with said racks, and means to move said indexing rack to turn said master gear and blank to index the latter.

28. A machine of the character described, comprising, in combination, a rotary cutter, a toothed member, a master gear for association with a gear blank, a reciprocable support for rolling said gear and blank over said member and cutter respectively, to generate an involute tooth space in the blank when said support is fed in each direction, and means automatically to index the blank on feed of said support in each direction.

29. A machine of the character described, comprising, in combination, a gear tooth cutter, means to support a gear blank in position to be acted upon by said cutter, a master gear associated with the gear blank, a normally fixed rack, a reciprocating support for rolling said master gear and blank over the rack and cutter respectively, to generate an involute tooth space in the blank when said support is fed in each direction, and an indexing rack at each end of the fixed rack to index the blank.

30. A machine of the character described, comprising, in combination, a gear tooth cutter, means to support a gear blank in position to be acted upon by said cutter, a master gear associated with the gear blank, a normally fixed rack, an indexing rack at each end of the fixed rack positioned to receive the master gear as it is rolled in either direction out of engagement with the fixed rack, and means for automatically moving the indexing racks engaging the master gear to index the latter.

In testimony whereof, I have signed my name to this specification.

WILLIAM C. FARNUM.